(12) United States Patent
Katsurayama et al.

(10) Patent No.: US 9,937,858 B2
(45) Date of Patent: Apr. 10, 2018

(54) ILLUMINATION DEVICE

(71) Applicant: HAYASHI TELEMPU CORPORATION, Nagoya-shi, Aichi (JP)

(72) Inventors: Hiroshi Katsurayama, Nagoya (JP); Shigeki Masaki, Nagoya (JP); Jun Koyama, Nagoya (JP)

(73) Assignee: HAYASHI TELEMPU CORPORATION, Nagoya (JP)

( * ) Notice: Subject to any disclaimer, the term of this patent is extended or adjusted under 35 U.S.C. 154(b) by 0 days.

(21) Appl. No.: 15/448,710

(22) Filed: Mar. 3, 2017

(65) Prior Publication Data

US 2017/0174125 A1 Jun. 22, 2017

Related U.S. Application Data

(63) Continuation of application No. PCT/JP2015/072325, filed on Aug. 6, 2015.

(30) Foreign Application Priority Data

Sep. 5, 2014 (JP) ................. 2014-181166

(51) Int. Cl.
*B60Q 3/54* (2017.01)
*B60Q 3/64* (2017.01)
(Continued)

(52) U.S. Cl.
CPC ............... *B60Q 3/64* (2017.02); *B60Q 3/217* (2017.02); *B60Q 3/54* (2017.02); *B60Q 3/78* (2017.02); *G02B 6/001* (2013.01); *G02B 6/0006* (2013.01)

(58) Field of Classification Search
CPC ... B60Q 3/64; B60Q 3/54; B60Q 3/78; B60Q 3/217; G02B 6/0006; G02B 6/001
See application file for complete search history.

(56) References Cited

U.S. PATENT DOCUMENTS 6,739,744 B2 * 5/2004 Williams ............... A61B 17/02
362/552
9,016,914 B2 4/2015 Ukai et al.
(Continued)

FOREIGN PATENT DOCUMENTS

JP 2008-189067 A 8/2008
JP 2008-189134 A 8/2008
(Continued)

OTHER PUBLICATIONS

International Preliminary Report on Patentability and Translation of Written Opinion, dated Mar. 16, 2017, from the International Bureau in counterpart International application No. PCT/JP2015/072325.

(Continued)

*Primary Examiner* — Mary Ellen Bowman
(74) *Attorney, Agent, or Firm* — Sughrue Mion, PLLC

(57) ABSTRACT

The illumination device includes a light source; an elongated light guide rod on which light emitted from the light source is made incident; a housing that houses the light guide rod; and a lens that scatters light emitted from the light guide rod, the light guide rod being flexible and formed in a substantially linear shape, and having a surface on which an emission pattern for emitting light in a specific direction is provided, the housing and the lens are being formed in a curved shape in conformity with a shape of the interior member, and the light guide rod being provided in the interior member in a state of being bent in a curved shape by being sandwiched between the housing and the lens.

9 Claims, 6 Drawing Sheets

(51) Int. Cl.
  *B60Q 3/217* (2017.01)
  *B60Q 3/78* (2017.01)
  *F21V 8/00* (2006.01)

(56) References Cited

U.S. PATENT DOCUMENTS

| | | | | |
|---|---|---|---|---|
| 2007/0014122 A1* | 1/2007 | Sakiyama | B60Q 1/323 | 362/501 |
| 2010/0238683 A1* | 9/2010 | Wang | G02B 6/001 | 362/555 |
| 2012/0127758 A1* | 5/2012 | Ishigami | G02B 6/001 | 362/628 |
| 2013/0051049 A1* | 2/2013 | Sato | B60Q 1/2607 | 362/511 |
| 2013/0094233 A1* | 4/2013 | Ukai | B60Q 3/51 | 362/511 |
| 2013/0314940 A1* | 11/2013 | Russert | C03B 37/01222 | 362/556 |
| 2014/0029292 A1* | 1/2014 | Mizushiro | G02B 6/0038 | 362/565 |
| 2015/0109815 A1* | 4/2015 | Ichikawa | G02B 6/0058 | 362/606 |
| 2017/0023723 A1* | 1/2017 | Tanaka | G02B 6/0045 | |

FOREIGN PATENT DOCUMENTS

| | | |
|---|---|---|
| JP | 2010-070126 A | 4/2010 |
| JP | 2010-285025 A | 12/2010 |
| JP | 2012-109131 A | 6/2012 |
| JP | 2013-86534 A | 5/2013 |
| JP | 2013-100100 A | 5/2013 |

OTHER PUBLICATIONS

International Search Report for PCT/JP2015/072325 dated Oct. 6, 2015 [PCT/ISA/210].

* cited by examiner

ILLUMINATION DEVICE

CROSS REFERENCE TO THE RET APED APPLICATION

This application is a continuation application, under 35 U.S.C. § 111(a), of international application No. PCT/JP2015/072325, filed Aug. 6, 2015, which is based on and claims Convention priority to Japanese patent application No. 2014-181166 filed Sep. 5, 2014, the entire disclosure of which is herein incorporated by reference as a part of this application.

BACKGROUND OF THE INVENTION

Field of the Invention

The present invention relates to an illumination device provided in the interior of an automobile.

Description of Related Art

Conventionally, an illumination device for illuminating occupant(s) provided on the ceiling between a driver's seat and a passenger seat, an illumination device provided along an edge portion of the ceiling across the front-rear direction or a longitudinal direction of a vehicle, an illumination device provided on the vehicle interior side of an automobile door, in particular, on a door trim serving as an inside lining panel, and the like have been known as general interior illumination devices, including, for example, automobile interior illumination devices.

Examples of the purpose of the illumination device provided on a door trim of an automobile include enhancement of the operability for an occupant in a darkened room by increasing the visibility of switches or the like provided on the door trim or illuminating the inside of a pocket (housing portion) provided on the door trim. These illumination devices may be installed, for example, in such a way that a light source and a light guide member are provided on the surface of the door trim or the inside of the pocket, and the illumination devices are lit in response to a switching operation performed by the occupant or to opening or closing of the door.

In recent years, for a purpose other than enhancement of the operability for the occupant in the darkened room as mentioned above, an illumination device installed on the door trim for the purpose of illumination in order to enhance the design quality is known. In this case, since the purpose is different from that of the above-described illumination devices, it is required to emit light in an elongated form along the contour of the member constituting the door trim, rather than brightly illuminating an arbitrary position in a spot form. Exemplary methods for achieving this include an example in which a resin elongated light guide member extending in the longitudinal direction of a vehicle is provided on the rear side of the member (e.g., switch panel) constituting the door trim, and an illumination effect is achieved by causing light to be leaked through a translucent lens from a gap between a switch panel and a door trim, which are opaque members (e.g., Patent Document 1).

RELATED DOCUMENT

Patent Document

[Patent Document 1] JP Laid-open Patent Publication No. 2013-100100

Here, the designed surface on the vehicle inner side of a door trim generally has a shape that is curved in the inward-outward direction or front-rear direction of the vehicle. With the technique according to Patent Document 1, it is necessary to use a soft tube-like light guide member such as an optical fiber as a light guide member in order to dispose the elongated light guide member in conformity with such a shape. However, a light guide member of this type is produced by extrusion molding, and thus has a low degree of freedom in varying the luminance in the longitudinal direction and is not suitable for illumination such as gradation emission in which the fine luminance distribution is controlled. As another technique, it is conceivable that fine luminance control is achieved by producing a light guide member having a curved shape in conformity with a designed surface by injection molding, and thereby forming an optical pattern in the form of recesses and projections. However, this technique has some problems that a minute optical pattern with less nonuniformity in luminance that can be formed by laser dotting cannot be formed on a surface having a curvature.

SUMMARY OF THE INVENTION

Therefore, it is an object of the present invention to provide an illumination device that can be disposed in a curved interior member of an automobile with a low cost and a simple configuration, without compromising the design quality, has less nonuniformity in luminance and a high degree of freedom in luminance distribution, and enables fine luminance control.

In order to achieve the above-described object, the present invention is directed to an illumination device provided in an interior member of an automobile, including:

a light source; an elongated light guide rod on which light emitted from the light source is made incident; a housing that houses the light guide rod; and a lens that scatters light emitted from the light guide rod, the light guide rod being flexible and formed in a substantially linear shape, and having a surface on which an emission pattern for emitting light in a specific direction is provided, the housing and the lens being formed in a curved shape in conformity with a shape of the interior member, and the light guide rod further being provided in the interior member in a state of being bent in a curved shape by being sandwiched between the housing and the lens.

The illumination device according to the present invention has a low cost, simple configuration that does not require any special processing such as three-dimensional laser dotting, or post-processing such as bending of the light guide rod. That is, with the illumination device according to the present invention, an emission pattern such as a laser dot pattern is provided on a substantially linear light guide rod that is flexible and is not curved, thus making it possible to easily achieve emission with less nonuniformity in luminance and a high degree of freedom in luminance distribution and to perform fine luminance control, as compared with a soft light guide rod such as an optical fiber. With the illumination device according to the present invention, the light guide rod is disposed along the curved interior member, so that the design quality will not be compromised.

It is preferable that at least one first abutting portion between the light guide rod and the lens and at least one second abutting portion between the light guide rod and the housing are disposed in a staggered manner along a longitudinal direction of the light guide rod. This configuration makes it possible to sandwich the light guide rod in a curved state, while dispersing the stress applied to the light guide rod, thus preventing anomalous emission caused by stress concentration, such as point emission and nonuniformity in emission When the first abutting portion and the second abutting portion are disposed in a staggered manner along the longitudinal direction of the light guide rod as described above, it is preferable that a dimension of a gap between the light guide rod and the lens in a region between the neighboring first abutting portions and a dimension of a gap between the light guide rod and the housing in a region between the neighboring second abutting portions are greater than 0 mm and less than 1 mm respectively. This can prevent anomalous emission and rattling of the light guide rod in a state in which the light guide rod is curved, thus reliably maintaining the abutting state at the respective abutting portions.

It is preferable that the dimension of the gap between the light guide rod and the lens in the region between the neighboring first abutting portions is smaller than the dimension of the gap between the light guide rod and the housing in the region between the neighboring second abutting portions. This allows the light guide rod to be firmly abutted against the housing to be curved so as to protrude toward the vehicle outer side, thereby making it possible to reliably maintain the abutting state at the first abutting portions and the second abutting portions in a state in which the light guide rod is curved.

It is possible to adopt a configuration in which the light guide rod includes a flat surface and an exit surface having a curvature, a cross-sectional shape of the light guide rod is substantially fan-shaped, and the emission pattern is formed on the flat surface. This configuration enables directional emission in a specific direction and fine luminance control by providing a predetermined configuration on each of the surfaces.

The light emitted from the light guide rod may be gradation emission having a nonuniform luminance distribution in the longitudinal direction of the light guide rod.

In the above-described luminance distribution of gradation emission, a gradient, with which the luminance is decreased from the position of a maximum luminance, may be changed in a stepwise manner. This allows a viewer to easily recognize the brightness and darkness of light not as simple light attenuation, but as gradation.

As for the above-described gradient with which the luminance is decreased from the position of the maximum luminance, the gradient may be most significantly decreased at the position of the maximum luminance, and a gradient thereafter may be more gently decreased as compared with the gradient at the position of the maximum luminance. This allows a viewer to even more easily recognize gradation emission.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 2B is an exploded plan view of the illumination device;

DESCRIPTION OF EMBODIMENTS

Figure 1A:
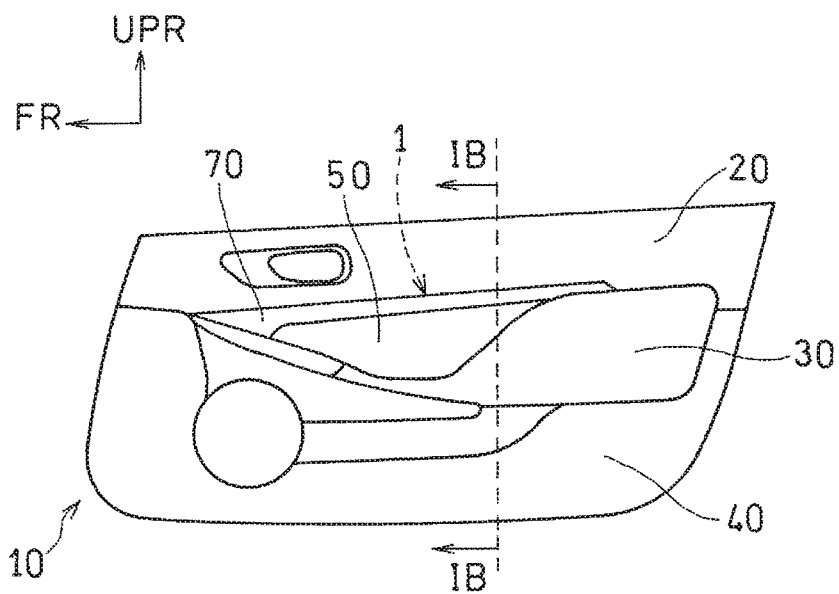
FIG. 1A is a diagram showing a general outline of an interior component (door trim) including an illumination device according to the present embodiment.
Figure 1B:
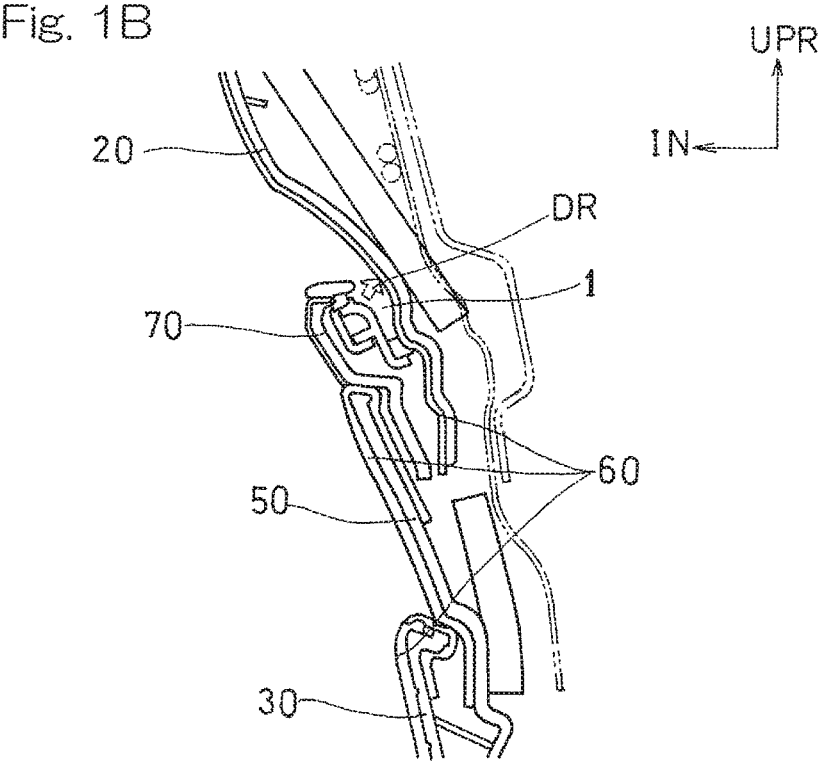
FIG. 1B is a cross-sectional view taken along a line IB-IB in FIG. 1A.
Figure 2A:
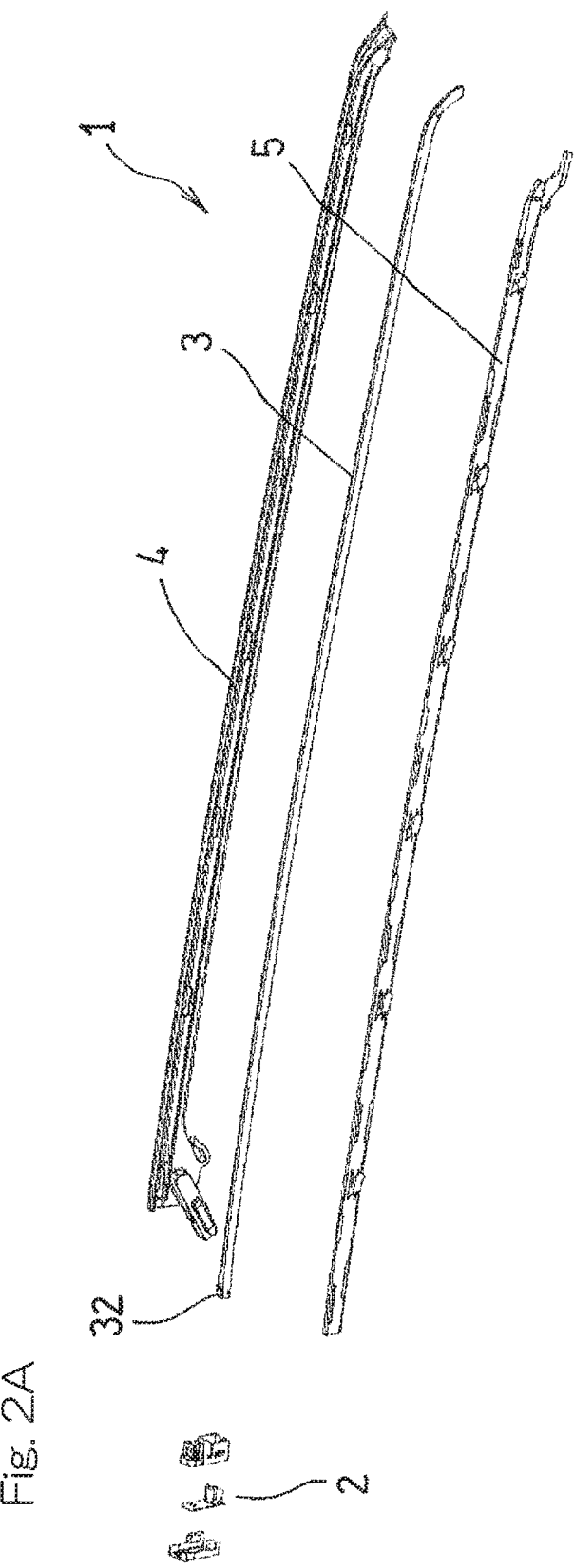
FIG. 2A is an exploded perspective view of the illumination device.
Figure 3A:
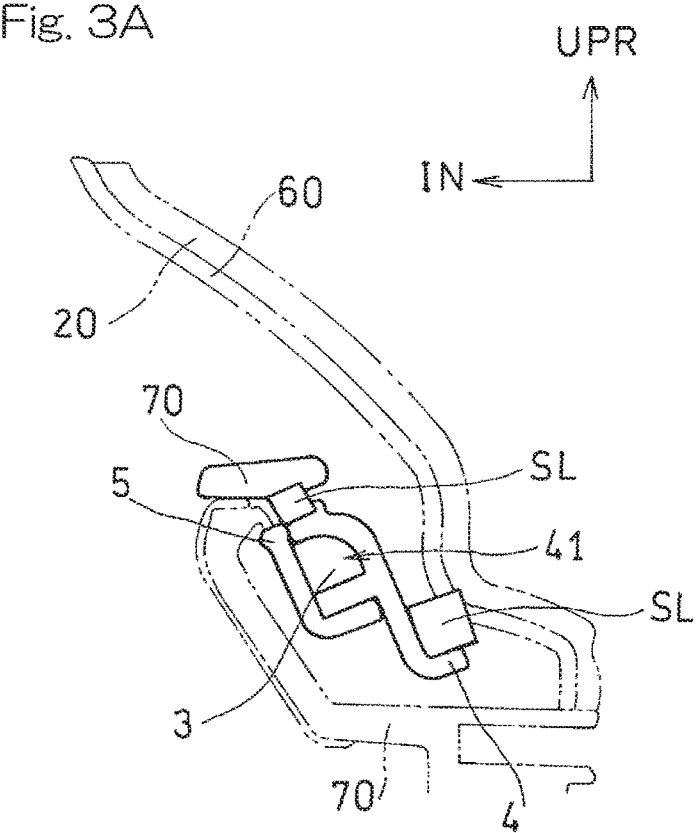
FIG. 3A is an enlarged cross-sectional view of the vicinity of the illumination device shown in FIG. 1B.
Figure 3B:
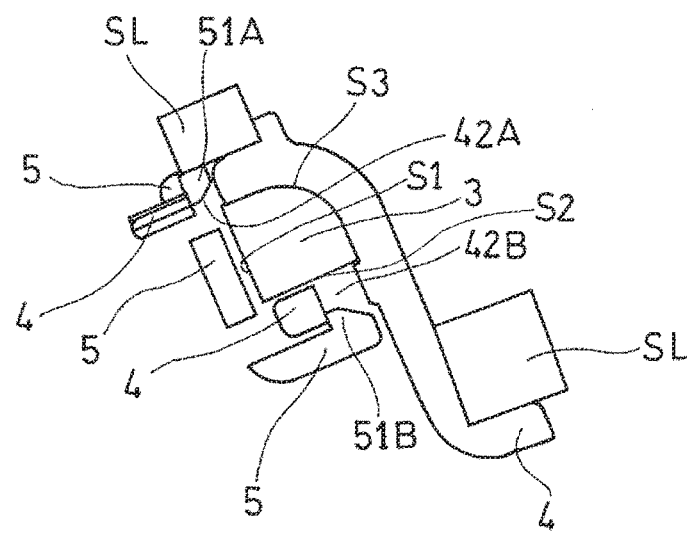
FIG. 3B is an enlarged cross-sectional view of the vicinity of a light guide rod shown in FIG. 1B.
Figure 4A:
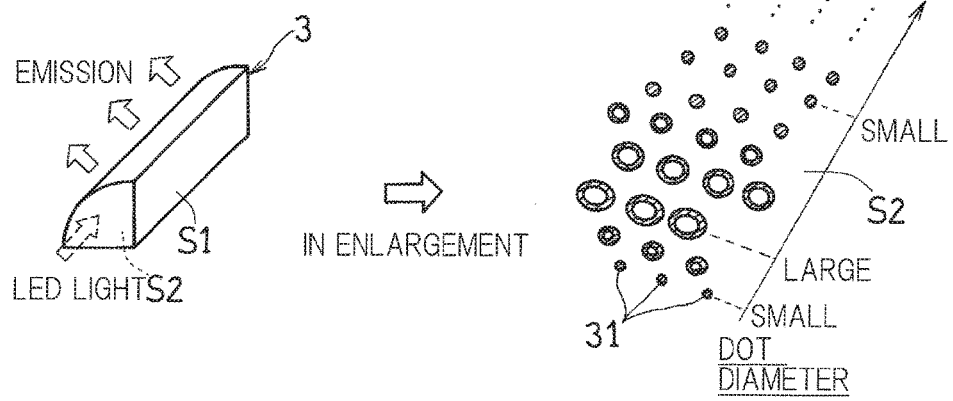
FIG. 4A is a schematic diagram showing an optical pattern of the light guide rod.
Figure 4B:
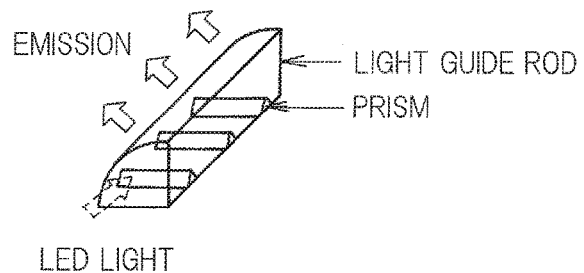
FIG. 4B is a schematic diagram of a light guide rod including a prism.
Figure 5:
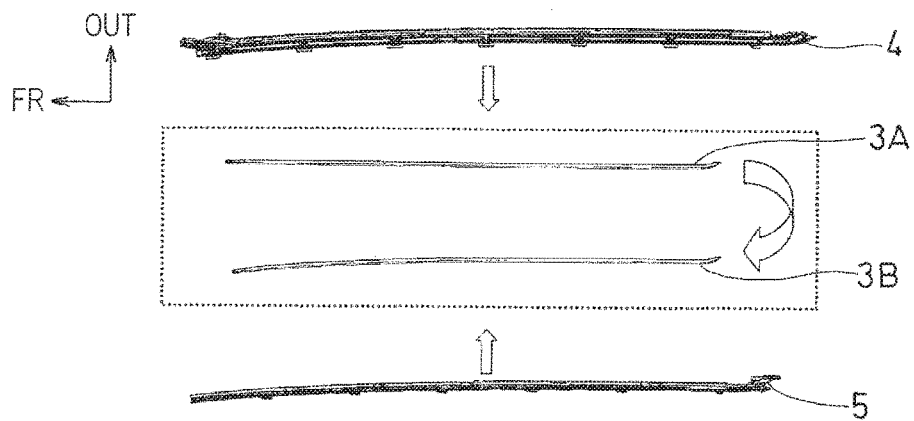
FIG. 5 is a plan view showing fixation and deformation of the light guide rod.
Figure 6:
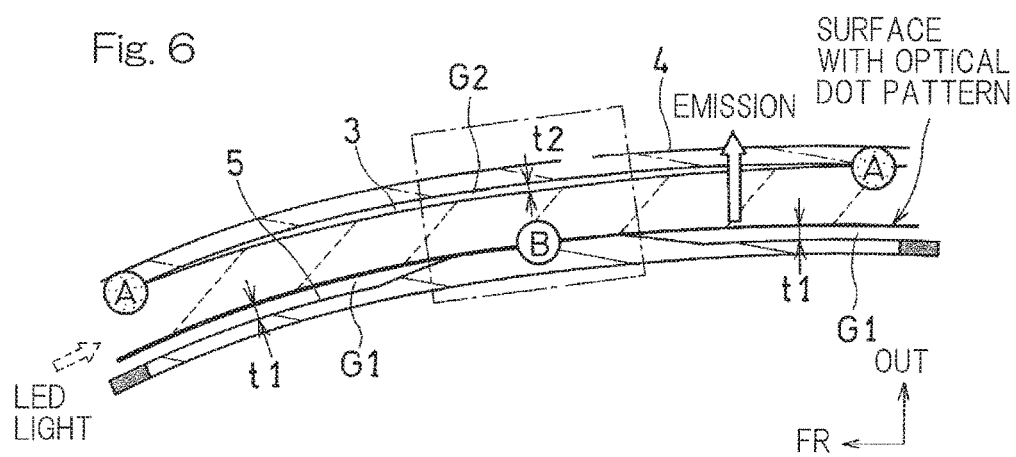
FIG. 6 is a partial enlarged view showing a light guide rod in a fixed state.
Figure 7:
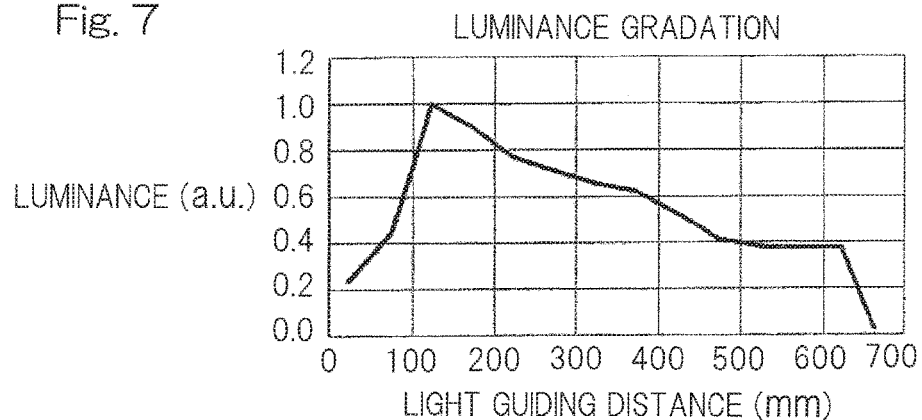
FIG. 7 is a graph showing a luminance distribution of gradation emission.
Figure 8:
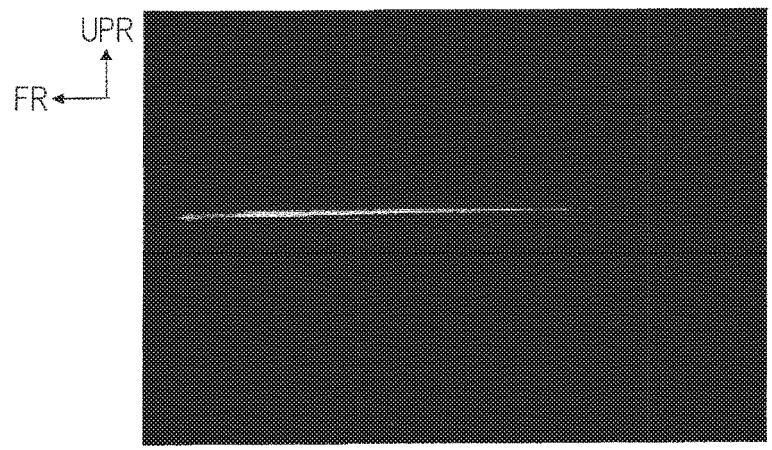
FIG. 8 is an image diagram of an actual emission state of the illumination device according to the present embodiment.

Hereinafter, an embodiment of the present invention will be described with reference to the drawings. FIG. 1A is a diagram showing a general outline of an interior component (door trim) including an illumination device 1 as viewed from the vehicle interior side, and FIG. 1B is a cross-sectional view taken along a line IB-IB in FIG. 1A. FIG. 2A is an exploded perspective view of the illumination device 1, and FIG. 2B is an exploded plan view of the illumination device 1. FIG. 3A is an enlarged cross-sectional view of the vicinity of the illumination device 1 shown in FIG. 1B. FIG. 3B is a further enlarged cross-sectional view of the vicinity of a light guide rod 3. FIG. 4A is a schematic diagram of a light guide rod 3 having an optical pattern or emission pattern according to the present embodiment. FIG. 4B is a schematic diagram of a light guide rod including a prism. FIG. 5 is a plan view showing fixation and deformation of the light guide rod 3. FIG. 6 is a partial enlarged view showing the vicinity of the light guide rod 3 that is curved in a fixed state. FIG. 7 is a graph showing a luminance distribution of gradation emission. FIG. 8 is an image diagram of an actual emission state of the illumination device according to the present embodiment. In the drawings, FR indicates the forward direction, UPR indicates the upward direction, IN indicates the vehicle inward direction, and OUT indicates the vehicle outward direction.

A door trim 10 serving as a vehicle interior member in the present embodiment will be described, taking, as an example, a door trim attached to a door (not shown) on the right side of a front seat of a vehicle, as shown in FIG. 1A. In FIG. 1A, the left side (leftward) in the drawing is referred to as the front side (forward) of the vehicle. The door trim 10 is disposed such that its surface on the vehicle exterior side opposes the vehicle interior side of a door panel (not shown) constituting an exterior member of a vehicle door.

The door trim 10 is formed by coupling together members that are divided generally in the up-down direction, and includes, for example, a trim upper 20 serving as a member constituting its upper portion, an armrest 30 constituting its central portion, and a trim lower 40 constituting its lower portion. The base materials of the trim upper 20, the armrest 30, and the trim lower 40 are formed of a synthetic resin material such as polypropylene, a mixture of a wood-based material and a synthetic resin material, or the like. A skin 60 is attached, either partly or entirely, on the vehicle interior side of the door trim 10, as shown in FIG. 1B.

In the door trim 10 shown in FIG. 1A, an ornament 50 extending in the vehicle front-rear direction is mounted as a decorative member in front of the armrest 30. The base material of the ornament 50 is formed of a synthetic resin material or the like, similar to the other members described above, and the skin 60 is attached, as needed, as shown in FIG. 1B. Furthermore, in order to enhance the appearance design, an accent panel 70 shown in FIG. 1A such as an aluminum decorative panel may be mounted as needed. In the present embodiment, the accent panel 70 is located between the trim upper 20 and the ornament 50 in the up-down direction.

In the present embodiment, the illumination device 1 is disposed on the rear side (vehicle outer side) of the ornament 50, and light is emitted upward (toward the trim upper 20) from an elongated gap extending in the vehicle front-rear direction (longitudinal direction) between the ornament 50 and the trim upper 20. In FIG. 1B, this emission direction is indicated by DR. Here, the designed surface (the shape of the door trim 10) at the location at which the illumination device 1 is disposed has a shape that is curved so as to protrude toward the vehicle outside direction. As shown in the plan view in FIG. 2B, the illumination device 1 also has a shape that is curved as a whole so as to protrude toward the vehicle outside direction in conformity with the designed surface.

An overall configuration of the illumination device 1 will now be described. The illumination device 1 shown in FIG. 2A is composed of at least the light source 2, the elongated light guide rod 3, a lens 4, and a housing 5. In the present embodiment, one light source 2 is disposed for each illumination device 1, and the light source 2 is disposed adjacent to an incident surface 32 which is one end face of the light guide rod 3. The light source 2 is preferably an LED (light-emitting diode) from the viewpoint of space saving and cost saving. In order for the light incident from the light source 2 to be guided in the longitudinal direction, the light guide rod 3 is made of a transparent resin such as an acrylic resin or a polycarbonate resin, is formed by injection molding, and is linear before being disposed in the interior member. The light guide rod 3 has a thickness of 5 mm and a length of 650 mm, for example. When the light guide rod 3 is sandwiched between the lens 4 and the housing 5, the light guide rod 3 is deformed into a shape that is curved as a whole in conformity with the curved shapes of the lens 4 and the housing 5, as will be described later with reference to FIG. 5.

In order to allow transmission and scattering of the light emitted from an exit surface of the light guide rod 3, the lens 4 is made of a transparent resin such as an acrylic resin or a polycarbonate resin. The lens 4 is formed by injection molding, and has a shape that is curved as a whole toward the vehicle outside direction in conformity with the curved shape of the designed surface of the interior member in which the lens 4 is to be disposed. The lens 4 has a thickness of 2 mm and a length of 650 mm, for example. In order to collect the light leaking from the light guide rod 3 on the lens 4 side, the housing 5 is made of an opaque synthetic resin having a color close to the so-called natural light, such as polypropylene. The housing 5 is formed by injection molding, and has a shape that is curved as a whole toward the vehicle outside direction in conformity with the curved shape of the designed surface of the interior member in which it is to be disposed, as with the lens 4.

As shown in FIG. 3A, the illumination device 1 includes the housing 5, the light guide rod 3, and the lens 4 that are stacked generally in this order from the vehicle inner side toward the vehicle outer side, in a state in which the illumination device 1 is disposed in the interior member. The light guide rod 3 is fixed by being sandwiched between the housing 5 and the lens 4 so as to be fitted in a housing recess 41 of the lens 4. As shown in FIG. 3B, the housing 5 and the lens 4 are fixed to each other by engagement between a plurality of upper engaging holes 42A of the lens 4 and an upper engaging claw 51A of the housing 5, and engagement between a plurality of lower engaging holes 42B of the lens 4 and a lower engaging claw 51B of the housing 5.

A configuration of the light guide rod 3 will now be described. The light guide rod 3 is flexible and hard, includes two flat surfaces S1 and S2 and an to exit surface S3 having a curvature, as shown in FIG. 3B, and its cross section orthogonal to the longitudinal direction is substantially fan-shaped, and in the present embodiment, the cross section has a fan shape of substantially a quarter of a circle. The two flat surfaces S1 and 52 are orthogonal to each other such that a first flat surface S1 is inclined relative to the vertical direction and a second flat surface S2 is inclined relative to the horizontal direction, each by about 20 to 30°. The exit surface 53 has an arc-shaped transverse cross section, and is directed obliquely upward toward the outer side of the door. The light guide rod 3 is preferably flexible and harder than a commonly used optical fiber, and preferably has a flexural modulus or bending elastic modulus of 1500 to 4000 MPa. When the flexural modulus is smaller than this range, there may be a situation where a minute optical pattern, which will be described later, cannot be formed, or the desired luminance control cannot be achieved as a result of the optical pattern being distorted when the light guide rod 3 is curved. When the flexural modulus is larger than this range, there may be a situation where the shape of the light guide rod 3 cannot follow the designed surface of the curved interior member, or the light guide rod 3 is broken when curved. Thus, it is possible to achieve directional emission in a specific direction and fine luminance control that cannot be achieved by an optical fiber that is softer than the light guide rod 3. In the present embodiment, the specific direction is the DR direction shown in FIG. 1B on the transverse cross section. Thus, during a fixation of the light guide rod 3, which will be described later, the light guide rod 3 can have a cross-sectional shape that can be easily bent so as to protrude toward the vehicle outside direction.

The light guide rod 3 has an optical pattern on at least one of the two flat surfaces S1 and S2. As shown in FIG. 4A, the optical pattern is preferably a dot pattern composed of circular dots that is produced by laser processing with a recessed and projected pattern formed on a mold. The circular dots are formed to be recessed inward, for example, on the flat surface S2 of the light guide rod 3. In the dot pattern, a large number of dots 31 are arranged along the longitudinal direction of the light guide rod 3. This arrangement is, for example, a staggered arrangement along the longitudinal direction of the light guide rod 3. The diameter of the dots 31 is, for example, 50 to 500 μm. In the present embodiment, in order to achieve gradation emission, that is, luminance gradation shown in FIG. 7, which will be described later, the diameter of the dots 31 is set, along the longitudinal direction of the light guide rod 3, so as to first gradually increase as the dots 31 are separated from the light source 2, and to gradually decrease thereafter and after a predetermined position at which a maximum luminance is reached in FIG. 7 (the position at which the light guiding distance is about 120 mm). With this configuration, the light from the light source 2 is deflected by the plurality of dots 31 as the light is separated from the light source 2, and the light amount emitted from the exit surface S3 is decreased, so that the luminance is lowered. Accordingly, the luminance can be freely set by appropriately changing the diameter of the dots 31. The luminance control may also be performed by changing the number of the dots at various positions, or in other word, changing the density of the dots, while keeping the diameter of the dots 31 constant.

In the present embodiment, a YAG laser is used in laser processing. To perform laser dotting, the surface on which a pattern is formed needs to be flat due to constraints on the processing steps. Therefore, laser dotting cannot be performed if a mold, in which the portions corresponding to the flat surfaces of the light guide rod 3 are curved, is used in order to initially provide the light guide rod 3 with a curve in conformity with the designed surface. Meanwhile, as the method for forming a dot pattern, a method using three-dimensional laser processing is also available. However, in this case, there are problems such as variations in accuracy of the shapes of minute dots and an increased cost. Therefore, in the present embodiment, the light guide rod 3 is linear during injection molding, and three-dimensional laser processing is not used during processing of a dot pattern on a mold. Accordingly, it is possible to achieve fine luminance control with less nonuniformity in luminance and an increased degree of freedom in luminance as compared with a light guide member of an optical fiber. In the present embodiment, the luminance distribution is nonuniform, and emission from the light guide rod 3 is gradation emission. As shown in FIG. 4B, the light guide rod 3 may be a light guide rod including, on at least one of the two flat surfaces S1 and S2, a prism pattern that is recessed inward of the light guide rod 3. However, in the case of this prism pattern, the prisms themselves cause line emission and it is difficult to perform fine luminance control, so that smooth change in luminance is somewhat difficult.

Next, a structure for fixing the light guide rod 3 will be described. The light guide rod 3 is disposed in the interior member by being sandwiched between the lens 4 and the housing 5. The lens 4 and the housing 5 are disposed relative to the ornament 50, the accent panel 70, and the trim upper 20 via a sealant SL (FIGS. 3A and 3B). As shown in FIG. 5, in a state of being disposed in the interior member, a linear light guide rod 3A is sandwiched between the lens 4 and the housing 5, and thus becomes a light guide rod 3B that is bent into a curved shape in conformity with the designed surface of the interior member along the lens 4 and the housing 5. Consequently, it is possible to dispose the light guide rod so as to follow the curved shape of the designed surface at a low cost, without the need to curve the light guide rod by post-processing. Referring to FIG. 3A, the assembly of the light guide rod 3, the lens 4, and the housing 5 is fixed to the accent panel 70. Specifically, a substantially L-shaped claw portion (not shown) formed on the surface of the housing 5 that is opposite to the light guide rod is inserted through a hole portion (not shown) formed in the base material of the accent panel 70 so as to slide the entire assembly, and thereby, the claw portion of the housing 5 and the hole portion of the accent panel 70 are engaged, and the assembly is fixed to the accent panel 70.

In sandwiching the light guide rod 3 between the lens 4 and the housing 5, it is preferable that, as shown in FIG. 6, a first abutting portion A between the light guide rod 3 and the lens 4 and a second abutting portion B between the light guide rod 3 and the housing 5 in the curving direction (vehicle width direction) are arranged in an alternating manner, more specifically, in a staggered manner, along the longitudinal direction of the light guide rod 3. It is preferable that a plurality of first abutting portions A and a plurality of second abutting portions B are provided along the longitudinal direction. In order to facilitate dispersion of stress, opposite ends of the light guide rod 3 are at or in the vicinity of the first abutting portions A. This allows the light guide rod 3 to be sandwiched while dispersing the stress applied thereto, thereby making it possible to prevent anomalous emission caused by stress concentration, such as point emission and nonuniformity in emission.

In other words, a gap G1 having a dimension t1, which is formed between the light guide rod 3 and the housing 5 and in a region between the neighboring second abutting portions B and B, and a gap G2 having a dimension of t2, which is formed between the light guide rod 3 and the lens 4 and in a region between the neighboring first abutting portions A and A, are arranged in a staggered manner. In order to ensure the abutting state at the first abutting portions A and the second abutting portions B, the dimension t1 is preferably in the range of 0<t1<1 mm, for example, t1=0.5 mm, and the dimension t2 is preferably in the range of 0<t2<1 mm, for example, t2=0.4 mm. When the dimensions t1 and t2 are smaller than the above-described ranges, the stress applied to the light guide rod 3 cannot be dispersed, causing anomalous emission. When the dimensions t1 and t2 are larger than the above-described ranges, rattling of the light guide rod 3 is caused. In order to cause the light guide rod 3 to be firmly abutted against the housing 5 to be curved so as to protrude toward the vehicle outer side, it is preferable that t2<t1. Accordingly, it is possible to reliably maintain the abutting state at the abutting portions A and B in a state in which the light guide rod is curved.

With the above-described configuration, the light emitted from the illumination device 1 forms gradation emission in which the luminance distribution is nonuniform in the longitudinal direction, and more specifically, has a luminance distribution as shown in the graph in FIG. 7. In FIG. 7, the horizontal axis represents the light guiding distance, and the vertical axis represents the ratio of a relative luminance taking the maximum luminance as 1.0. Here, in the luminance distribution of the gradation emission, the position of a maximum luminance is set at a point at a distance of about 120 mm from an end face 32 (light guiding distance=0.0 mm) of the light guide rod 3 having an overall length of 650 mm shown in FIG. 7, and the gradient with which luminance is decreased (the angle of inclination on the graph) is changed "in a stepwise manner" from this point. This allows a viewer to more easily recognize the brightness and darkness of light not as mere light attenuation, but as graduation. In a luminance distribution in which the gradient is decreased "linearly in a stepless manner", the viewer perceives the brightness and darkness of light only as light attenuation. It is preferable that the above-described gradient is first significantly decreased from the position of the maximum luminance, and is subsequently gently decreased. In the example shown in FIG. 7, this change of gradient is repeated twice. For example, the gradient at a point of about 120 to about 220 mm is larger than the gradient at a point of about 220 mm to about 370 mm, and the gradient at a point of about 370 to about 470 mm is larger than the gradient at a point of about 470 mm to about 630 mm. In FIG. 7, the gradient at a point of about 120 to about 220 mm is steeper than the gradients at the other points. This allows the viewer to even more easily recognize gradation emission. How smooth the gradation emission can be made and how easily the gradation emission can be recognized by the viewer, greatly depend on the ratio of a relative luminance, rather than on the absolute magnitude of luminance. Therefore, a relative magnitude of the above-described gradient in the light guiding distance is important. As a door trim, it is preferable that the maximum luminance is achieved at the position at a distance of about 200 mm to 800 mm from the position of the head of an occupant toward the vehicle forward direction. Consequently, the illumination device 1 allows the occupant to more easily recognize gradation emission at a position that can easily enter in the field of view of the occupant, without causing glare to the occupant.

The present invention is not limited to the embodiment described above, and various additions, modifications, or deletions may be made without departing from the gist of the invention. For example, an embodiment in which the position and the shape are freely changed according to the situation such as a layout in the vehicle compartment is also included in the present invention.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . illumination device
2 . . . light source
3 . . . light guide rod
31 . . . dot
4 . . . lens
5 . . . housing
A . . . first abutting portion
B . . . second abutting portion
G1, G2 . . . gap
S1 . . . first flat surface
S2 . . . second flat surface
S3 . . . exit surface
t1 . . . dimension of gap between light guide rod and housing in region between neighboring second abutting portions
t2 . . . dimension of gap between light guide rod and lens in region between neighboring first abutting portions

What is claimed is:

1. An illumination device provided in an interior member of an automobile, comprising:
a light source; an elongated light guide rod on which light emitted from the light source is made incident; a housing that houses the light guide rod; and a lens that scatters light emitted from the light guide rod,
the light guide rod being flexible and formed in a substantially linear shape, and having a surface on which an emission pattern for emitting light in a specific direction is provided,
the housing and the lens being formed in a curved shape in conformity with a shape of the interior member, and
the light guide rod further being provided in the interior member in a state of being bent in a curved shape by being sandwiched between the housing and the lens.

2. The illumination device as claimed in claim 1, wherein at least one first abutting portion between the light guide rod and the lens and at least one second abutting portion between the light guide rod and the housing are disposed in a staggered manner along a longitudinal direction of the light guide rod.

3. The illumination device as claimed in claim 2, wherein a dimension of a gap between the light guide rod and the lens in a region between the neighboring first abutting portions and a dimension of a gap between the light guide rod and the housing in a region between the neighboring second abutting portions are greater than 0 mm and less than 1 mm respectively.

4. The illumination device as claimed in claim 3, wherein the dimension of the gap between the light guide rod and the lens in the region between the neighboring first abutting portions is smaller than the dimension of the gap between the light guide rod and the housing in the region between the neighboring second abutting portions.

5. The illumination device as claimed in claim 1, wherein the light guide rod includes a flat surface and an exit surface having a curvature, a cross-sectional shape of the light guide rod is substantially fan-shaped, and the emission pattern is formed on the flat surface.

6. The illumination device as claimed in claim 5, wherein the emission pattern is a dot pattern including circular dots, the dot pattern being a recessed and projected pattern,
the circular dots are arranged in a staggered manner along a longitudinal direction of the light guide rod, and
a diameter of the circular dots is set so as to gradually increase as the circular dots are separated from the light source, and to gradually decrease thereafter and after a predetermined position.

7. The illumination device as claimed in claim 5, wherein the emission pattern is a prism pattern recessed inwards of the light guide rod.

8. The illumination device as claimed in claim 1, wherein the light emitted from the light guide rod is gradation emission having a nonuniform luminance distribution in a longitudinal direction of the light guide rod.

9. The illumination device as claimed in claim 1, wherein the light guide rod has a flexural modulus of 1500 to 4000 MPa.

* * * * *